(12) United States Patent
Bloom et al.

(10) Patent No.: US 6,490,067 B2
(45) Date of Patent: Dec. 3, 2002

(54) MULTI-CHANNEL OPTICAL TRANSCEIVER (75) Inventors: Scott H. Bloom, Encinitas, CA (US); Victor J. Chan, San Diego, CA (US); Jim Alwan, Ramona, CA (US)

(73) Assignee: Airfiber, Inc., San Diego, CA (US)

( * ) Notice: Subject to any disclaimer, the term of this patent is extended or adjusted under 35 U.S.C. 154(b) by 0 days.

(21) Appl. No.: 09/860,078

(22) Filed: May 16, 2001

(65) Prior Publication Data

US 2001/0043379 A1 Nov. 22, 2001

Related U.S. Application Data (60) Provisional application No. 60/204,360, filed on May 16, 2000.

(51) Int. Cl.⁷ .............................................. H04B 10/00
(52) U.S. Cl. ........................ 359/152; 359/159; 359/172; 359/133
(58) Field of Search ................................. 359/113, 114, 359/152, 153, 127, 133, 172, 159, 110; 385/88, 89, 92, 93

(56) References Cited

U.S. PATENT DOCUMENTS

| | | | |
|---|---|---|---|
| 3,743,385 A | * 7/1973 | Schaefer | ...................... 350/189 |
| 4,355,893 A | 10/1982 | Chicklis | |
| 4,453,806 A | 6/1984 | Wick | |
| 4,902,127 A | 2/1990 | Byer et al. | |
| 5,060,304 A | * 10/1991 | Solinsky | ...................... 359/152 |
| 5,181,211 A | 1/1993 | Burnham et al. | |
| 5,383,200 A | 1/1995 | Barrett et al. | |
| 5,451,765 A | 9/1995 | Gerber | |
| 5,548,434 A | * 8/1996 | Shimonaka et al. | ......... 359/161 |
| 5,685,636 A | 11/1997 | German | |
| 5,726,786 A | * 3/1998 | Heflinger | ...................... 359/152 |
| 5,745,515 A | 4/1998 | Marta et al. | |
| 5,777,768 A | * 7/1998 | Korevaar | ...................... 359/172 |
| 6,014,236 A | * 1/2000 | Flaherty | ...................... 359/118 |
| 6,049,593 A | * 4/2000 | Acampora | ................... 379/56.2 |
| 6,282,000 B1 | * 8/2001 | Kikuchi et al. | .............. 359/152 |
| 6,353,491 B1 | * 5/2002 | Tanaka et al. | ............... 359/152 |

* cited by examiner

*Primary Examiner*—Leslie Pascal
*Assistant Examiner*—Hanh Phan
(74) *Attorney, Agent, or Firm*—Knobbe, Martens, Olson & Bear, LLP (57) ABSTRACT

An optical transceiver such as used, for example, in a wireless optical network (WON), includes multiple laser sources including a first laser source configured to transmit a first 5 output channel beam having a first optical characteristic and at least a second laser source configured to transmit a second output channel beam having a second optical characteristic; multiple detectors including a first detector configured to detect a first input channel beam having the first optical characteristic and at least a second detector configured to detect a second input channel beam having the second optical characteristic; and multiple apertures including a first aperture through which the first output channel beam and the second input channel beam pass and a second aperture through which the second output channel beam and the first input channel beam pass.

49 Claims, 11 Drawing Sheets

FIG. 1

(PRIOR ART)

| COMPONENT | SPECIFICATIONS |
|---|---|
| LASER SOURCE | 785 nm/830 nm Edge-Emitter Laser Diode Lensed for ~ 15° Circular Spot |
| DETECTOR | Large Area Avalanche Photo Diode 0.5 mm Diameter Active Area |
| TRANSMIT/RECEIVE OPTICS | F/# 2.1 Achromat Doublet to Achieve 500 μrad Divergence with Collimated Beam for Color Separation |
| DICHROIC MIRROR | Long-wave Pass Dielectric Thin Film Mirror at 45° Incidence |
| BANDPASS FILTER(S) | Interference Filters with greater than 70% Transmission and 20 nm Bandwidth. Blocking $\geq 10^{-5}$ Outside Passband. |

MULTI-CHANNEL OPTICAL TRANSCEIVER

RELATED APPLICATION

This application claims the benefit of U.S. Provisional Patent Application No. 60/204,360, filed May 16, 2000.

FIELD OF THE INVENTION

The present application relates to optical transceiver technology, for example, as used in a wireless optical network (WON).

BACKGROUND

Wireless optical networks (WONs) are becoming increasingly popular in the telecommunications market as a strategy to meet last-mile demand, enabling reliable high-bandwidth connectivity previous available only to customers directly connected to fiber or cable. An example of a WON is Airfiber's OptiMesh system, which is described generally in U.S. Pat. No. 6,049,593, and co-pending U.S. patent application Ser. No. 09/181,043, entitled "Wireless Communication Network."

Historically used by military and aerospace industry, WON technology has evolved into systems with backup and redundant optical links, providing high reliability and fiber-like bandwidth to customers located up to a kilometer away from buried fiber. Such systems are being deployed to commercial buildings in urban area, breaking the so-called "last-mile" bottleneck. These WONs provide higher bandwidth than Radio Frequency (RF) wireless systems and are considerably less expensive to deploy than laying fiber.

Figure 1:
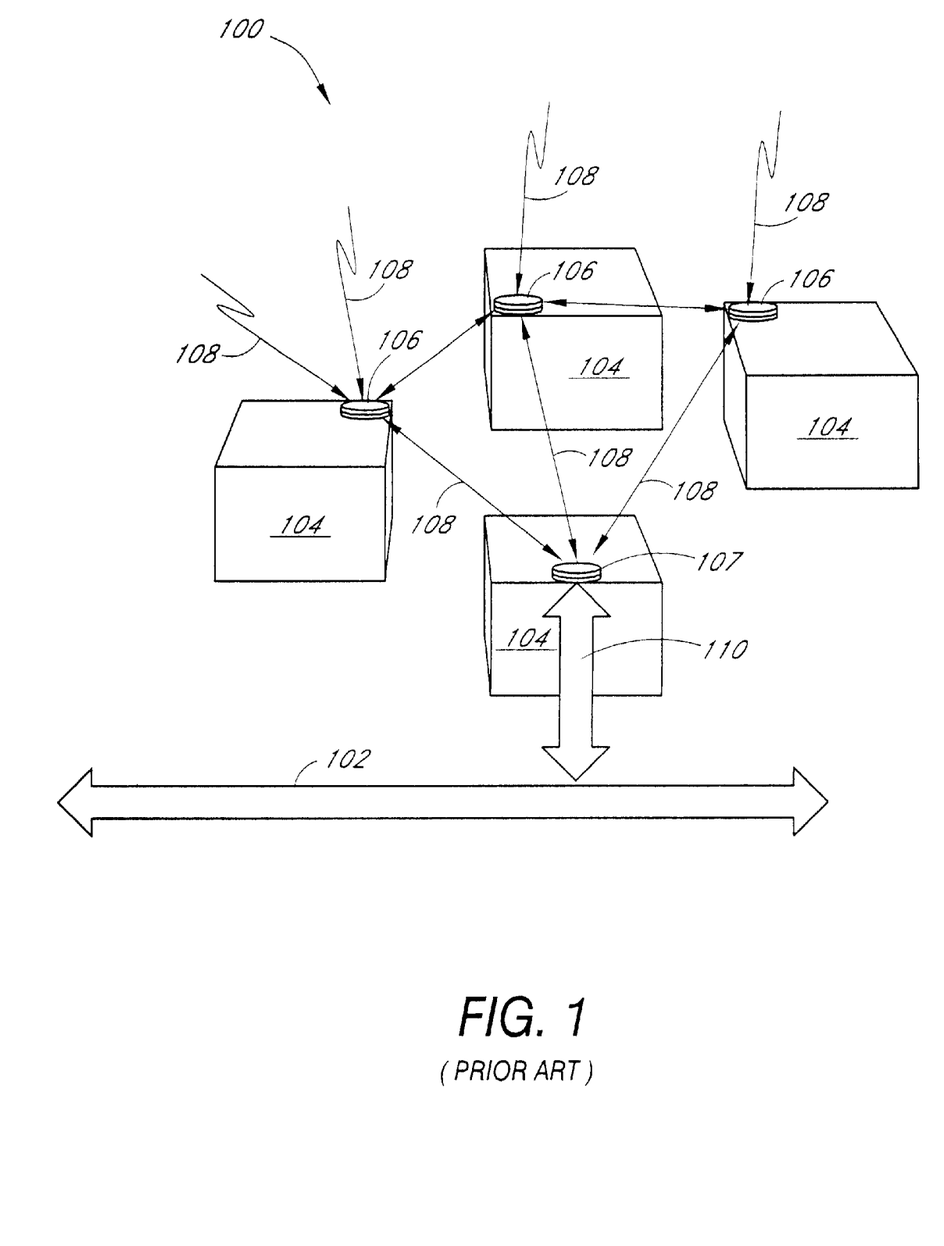
FIG. 1 shows an example of a WON application.

FIG. 1 illustrates an example of a WON application. As shown therein, facilities 104 (e.g., commercial office buildings) can be linked to a high bandwidth network 102 (e.g., a fiber-based network) by means of optical transceivers 106 and 107, which use "open-air" or "free-space" laser beams to maintain wireless, high bandwith communication links 108 among each other. The central, or main, optical transceiver 107 can have a communication link 110 (e.g., either wired or wireless) to the network 102, and thereby serve as a hub for the other optical transceivers 106.

Figure 2:
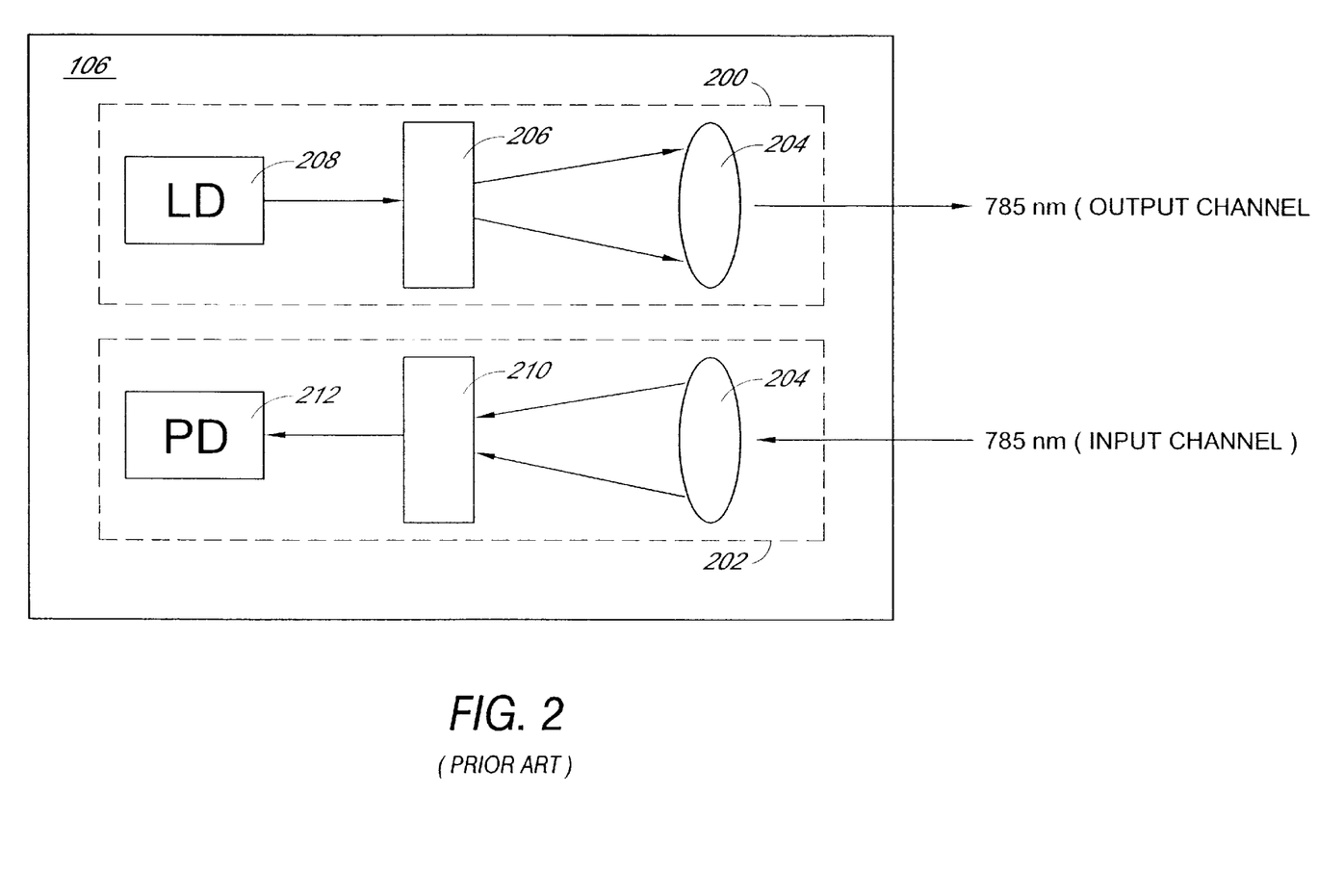
FIG. 2 is a block diagram of a conventional WON transceiver.

FIG. 2 shows an example of a conventional wireless optical transceiver 106. As shown therein, the transceiver 106 is composed of two basic elements: an output channel 200 for transmitting a laser beam (modulated or otherwise impressed with data) to another transceiver in the WON, and input channel 202 for receiving a modulated laser beam from another transceiver in the WON. Each of the input and output channels is composed of three basic components. The output channel 200 includes a laser diode (LD), which emits a laser beam of a predetermined wavelength (in this example, 785 nanometers) that passes through a diffuser 206 and which is focused by optics 204 (e.g., a plano aspheric lens). An incoming beam, for example, from another transceiver in the WON, is received by optics 204 of the input channel 202, passed through a bandpass filter 210 and ultimately received by a photodetector (PD), e.g., an avalanche photodiode.

The open-air laser beams used by WONs to transmit and receive data pose a potential threat to human eye safety. The collimated, beam-like quality of a laser results in very high irradiance (also known as "power density" or "flux"), which can damage tissues in the human eye causing serious conditions such as photokeratitus ("welder's flash") and cataracts.

Accordingly, several laser safety standards have come into existence that specify and regulate the parameters of lasers operating in environments that may expose the human eye to laser radiation. In general, three main aspects of regulations exist for lasers and their usage: Class definitions, Accessible Emission Limits (AEL), and Maximum Permissible Exposure (MPE). The class definitions provide non-technical descriptions understandable to lay-persons, AELs define the classification breakpoints, and MPEs are based on biophysical data and indicate actual tissue damage thresholds.

Class definitions—for example, Class 1, 2, 3, or 4—provide an abbreviated way to readily communicate a hazard level to a user. Class 1 represents lasers that are safe under reasonably foreseeable conditions, including the possibility of a human eye being exposed, either aided (e.g., through binoculars) or unaided, to a laser beam. At the other end of the spectrum, a Class 4 laser is capable of producing hazardous diffuse reflections that may pose skin and fire hazards. As an example, to meet the most stringent standard—class 1—a laser operating at 785 nm must be limited in power density such that the power collected by a human eye exposed to the laser is no greater than 0.56 milliwatts (the class 1 AEL for 785 nm lasers). Various factors such as the distance from the eye to the laser during exposure, and whether the viewing is aided or not, have a significant impact on how much power is collected by the eye.

The present inventors recognized that, while increased demand for WON bandwidth and link range generally would require the power densities of lasers used in WON transceivers to be increased, eye safety standards and concerns for human ocular safety represent strict limits on increasing such power densities. For example, the optical transceiver shown in FIG. 2 uses 622 megabits per second in both directions. However, beyond some level—for example, 1.2 gigabits per second—more power would be required to sustain the data rate. Accordingly, the present inventors developed systems and techniques that, among other advantages, enable laser output devices such as WON transceivers to transmit and receive data at increased bandwidths but without exceeding existing safety standards and without increasing risks to humans.

SUMMARY

Implementations of the systems and techniques described here may include various combinations of the following features.

In one aspect, an optical transceiver such as used, for example, in a wireless optical network (WON), may include multiple laser sources including a first laser source configured to transmit a first output channel beam having a first optical characteristic and at least a second laser source configured to transmit a second output channel beam having a second optical characteristic; multiple detectors including a first detector configured to detect a first input channel beam having the first optical characteristic and at least a second detector configured to detect a second input channel beam having the second optical characteristic; and multiple apertures including a first aperture through which the first output channel beam and the second input channel beam pass and a second aperture through which the second output channel beam and the first input channel beam pass.

In an embodiment, the first optical characteristic may be a first wavelength (e.g., 830 nm) and the second optical characteristic may be a second wavelength different from the first wavelength (e.g., 785 nm). A difference between the first wavelength and the second wavelength is about 50 nanometers or greater. One or more of the wavelengths may be between 1530 and 1570 nanometers.

In another embodiment, the first optical characteristic may be a first polarization (e.g., transverse electric polarization) and the second optical characteristic may be a second polarization different from the first polarization (e.g., transverse magnetic polarization).

Laser sources that may be used include laser diodes, gas lasers, fiber lasers, and/or diode-pumped solid state (DPSS) lasers. In an embodiment, a laser diode is used that emits an output field that is either substantially transverse electric or substantially transverse magnetic.

Detectors that may be used includes an avalanche photodiode with a bandpass filter or an avalanche diode with a polarizer, for example, a transverse electric polarizer or a transverse magnetic polarizer.

The aperatures may include a lens, for example, a plano aspheric lens having a diameter of about 75 mm.

In an embodiment, the transceiver further may include multiple beamsplitters, including a first beamsplitter associated with the first aperture and a second beamsplitter associated with the second beamsplitter, which differentiate between the first and second optical characteristics. At least one of the beamsplitters may be an optical highpass filter such as a dichroic mirror. At least one of the beamsplitters may be a polarizing beamsplitter. One or more of the beamsplitters may pass beams of the first optical characteristic and reflect beams of the second optical characteristic. Alternatively, or in addition, one or more of the beamsplitters may pass beams of the second optical characteristic and reflect beams of the first optical characteristic.

In an embodiment, the first output channel beam passes through the first beamsplitter to the first aperture, the second input channel beam is reflected by the first beamsplitter to the second detector, the second output channel beam is reflected by the second beamsplitter to the second aperture, and the first input channel beam passes through the second beamsplitter to the first detector.

The transceiver further may include a third laser source configured to transmit a third output channel beam having a third optical characteristic, and a third detector configured to detect a third input channel beam of the third optical characteristic.

The transceiver may include at least two beamsplitters each configured to differentiate between the first and second optical characteristic. In that case, the laser sources, detectors and beamsplitters are arranged relative to each other such that, when the transceiver is operating, the first output channel beam will be passed and the second input channel beam will be reflected by a first beamsplitter, and such that the first input channel beam will be passed and the second output channel beam will be reflected by a second beamsplitter.

In another aspect, an optical transceiver includes a plurality of dichroic mirrors, each of which is configured to pass a beam of a first wavelength and reflect a beam of a second wavelength. The optical transceiver further includes multiple laser sources including a first laser source arranged to transmit a first output channel beam of the first wavelength through a first dichroic mirror and a second laser source arranged to transmit a second output channel beam of the second wavelength that is reflected by a second dichroic mirror. The transceiver also includes multiple photodetectors, including a first photodetector configured to detect a first input channel beam of the second wavelength reflected by the first dichroic mirror and a second photodetector configured to detect a second input channel beam of the first wavelength passed by the second dichroic mirror. The transceiver also includes multiple lenses including a first lens arranged to focus the first output channel beam and the first input channel beam and a second lens arranged to focus the second output channel beam and the second input channel beam.

The first and second lenses may be physically separated (e.g., by about 25 millimeters or greater) to increase eye safety. Further, the physical dimension of the lens (e.g., about 75 mm diameter) may be selected to increase eye safety.

In another aspect, an optical transceiver includes a laser source configured to transmit an output channel beam having a first optical characteristic; a photodetector configured to detect an input channel beam having a second optical characteristic different from the first optical characteristic; an aperture through which the output channel beam and the input channel beam pass; and a beamsplitter, arranged in an optical path of the aperture and the laser source, and configured to pass the output channel beam from the laser source to the aperture and to reflect the input channel beam from the aperture to the photodetector. The first and second optical characteristics may be different wavelengths and/or different polarizations.

In another aspect, performing wireless optical communication may be performed by using a first aperture to transmit a first output channel beam having a first optical characteristic and to receive a first input channel beam of a second optical characteristic different from the first optical characteristic; and using a second aperture to transmit a second output channel beam having the second optical characteristic and to receive a second input channel beam of the first optical characteristic. Further, at least one beamsplitter may be used to differentiate between the first and second optical characteristics, which may be different wavelengths and/or different polarizations. Data may be impressed upon the either or both of the first and second output channel beams using one or more of the following techniques: on/off keying, phase-shift keying, pulse-position modulation, and/or frequency-shift keying.

In another aspect, an optical transceiver may include multiple laser sources including a first laser source configured to transmit a first output channel beam having a first optical characteristic and at least a second laser source configured to transmit a second output channel beam having a second optical characteristic; multiple detectors including a first detector configured to detect a first input channel beam having the first optical characteristic and at least a second detector configured to detect a second input channel beam of the second optical characteristic; and multiple apertures including a first aperture through which the first and second output channel beams pass and a second aperture through which the first and second input channel beams pass.

In another aspect, a wireless optical network may include multiple optical transceivers, each of which is in communication with at least one other optical transceiver. Each of at least two of the optical transceivers may include the following: multiple laser sources including a first laser source configured to transmit a first output channel beam having a first optical characteristic and at least a second laser source configured to transmit a second output channel beam having a second optical characteristic; multiple detectors including a first detector configured to detect a first input channel beam having the first optical characteristic and at least a second detector configured to detect a second input channel beam of the second optical characteristic; and multiple apertures including a first aperture through which the first output channel beam and the second input channel beam pass and a second aperture through which the second output channel beam and the first input channel beam pass.

One or more of the following advantages may be provided. The techniques and methods described here result in an optical transceiver that provides dramatically increased bandwidth compared with a conventional transceiver but without any corresponding increase in ocular safety risks. By separating the output beams, the potential power collected by an observer's eye can be maintained at safe levels, while at the same time, providing roughly twice or more the total power output for the transceiver as a whole. Enabling the use of different techniques to differentiate the beams (e.g., based on wavelength or polarization) provides design and implementation flexibility.

Moreover, the systems and techniques described here enable the total bandwidth of an optical transceiver to be scalable to a high degree.

The details of one or more embodiments are set forth in the accompanying drawings and the description below. Other features, objects, and advantages of the invention will be apparent from the description and drawings, and from the claims.

DETAILED DESCRIPTION

Figure 3:
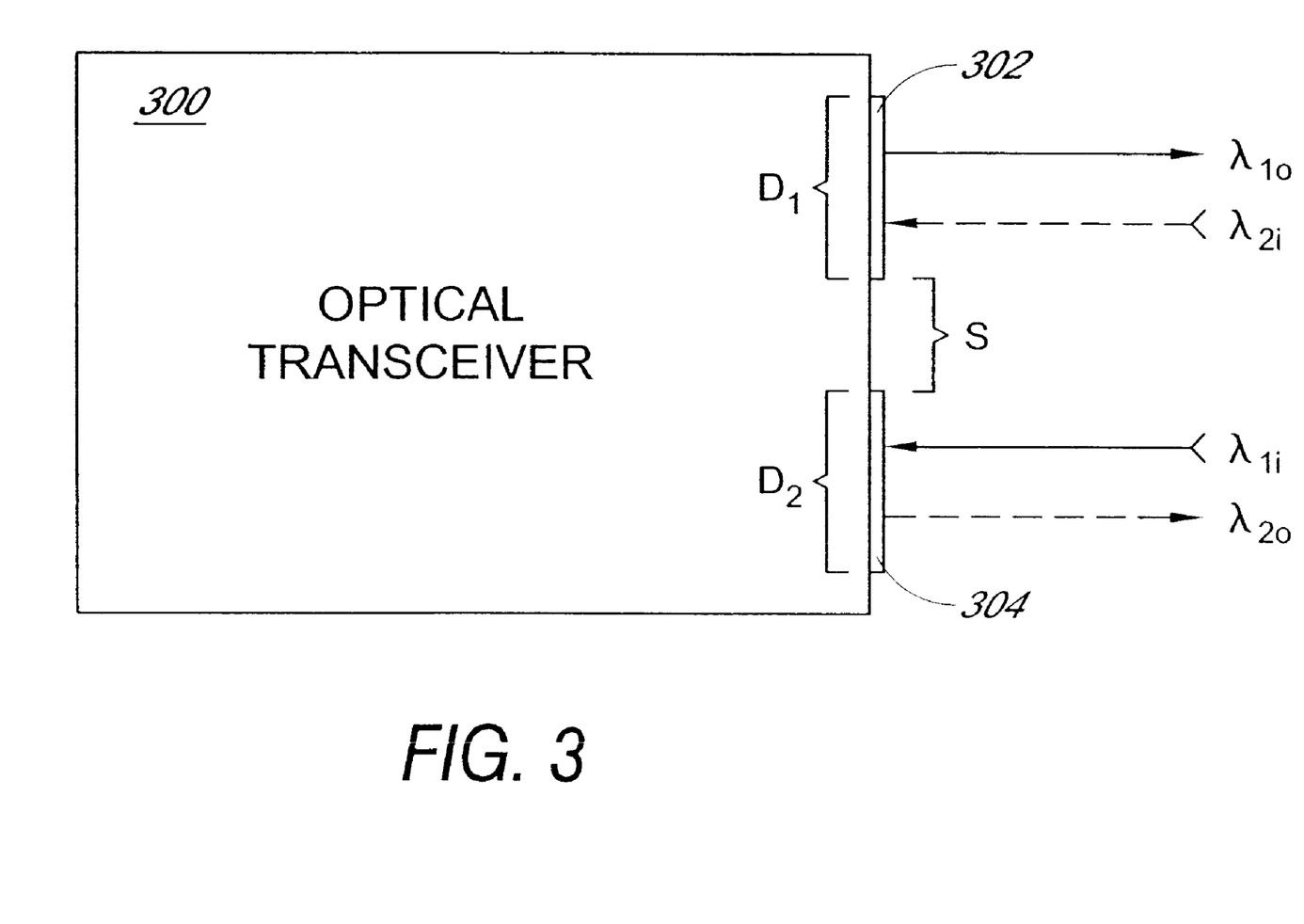
FIG. 3 is a block diagram of dual channel WON transceiver.

FIG. 3 shows a block diagram of a wavelength-based embodiment of an optical transceiver having two bi-directional channels. As shown in FIG. 3, the optical transceiver 300 has circuitry and other components therein, as described in more detail below, that enable it to transmit and receive data-carrying laser beams over two separate output channels $\lambda_{1o}$, $\lambda_{2o}$ and two separate input channels $\lambda_{1i}$ and $\lambda_{2i}$. Data can be impressed on the output laser beams using any of a number of methods including (1) on/off keying (OOK), which involves modulating the amplitude of laser emission; (2) phase-shift keying (PSK), which involves shifting the instantaneous phase of the modulated wave among predetermined discrete values; (3) pulse-position modulation (PPM), which involves varying the position in time of a pulse without modifying the pulse duration; or (4) frequency-shift keying (FSK), which involves shifting the output frequency of the laser between predetermined values. The optical transceiver 300 would transmit its two output beams to, and receive its two input beams from, another similar optical transceiver in the WON. Accordingly, the bandwidth of the transceiver 300 essentially can be double that of the conventional single-frequency transceiver shown in FIG. 1.

To enhance the eye safety of the transceiver, the two output channels $\lambda_{1o}$, $\lambda_{2o}$ are transmitted through different apertures 302 and 304, having a diameter D1 and D2, respectively, and separated by distance S. The values of D1, D2 and S can be chosen such that the MPE for the overall transceiver 300 satisfies the desired classification level. In particular, the values of D1, D2 and S can be chosen such that the eye of the human viewer essentially cannot be exposed to an aggregate irradiance in excess of the AEL.

Figure 4:
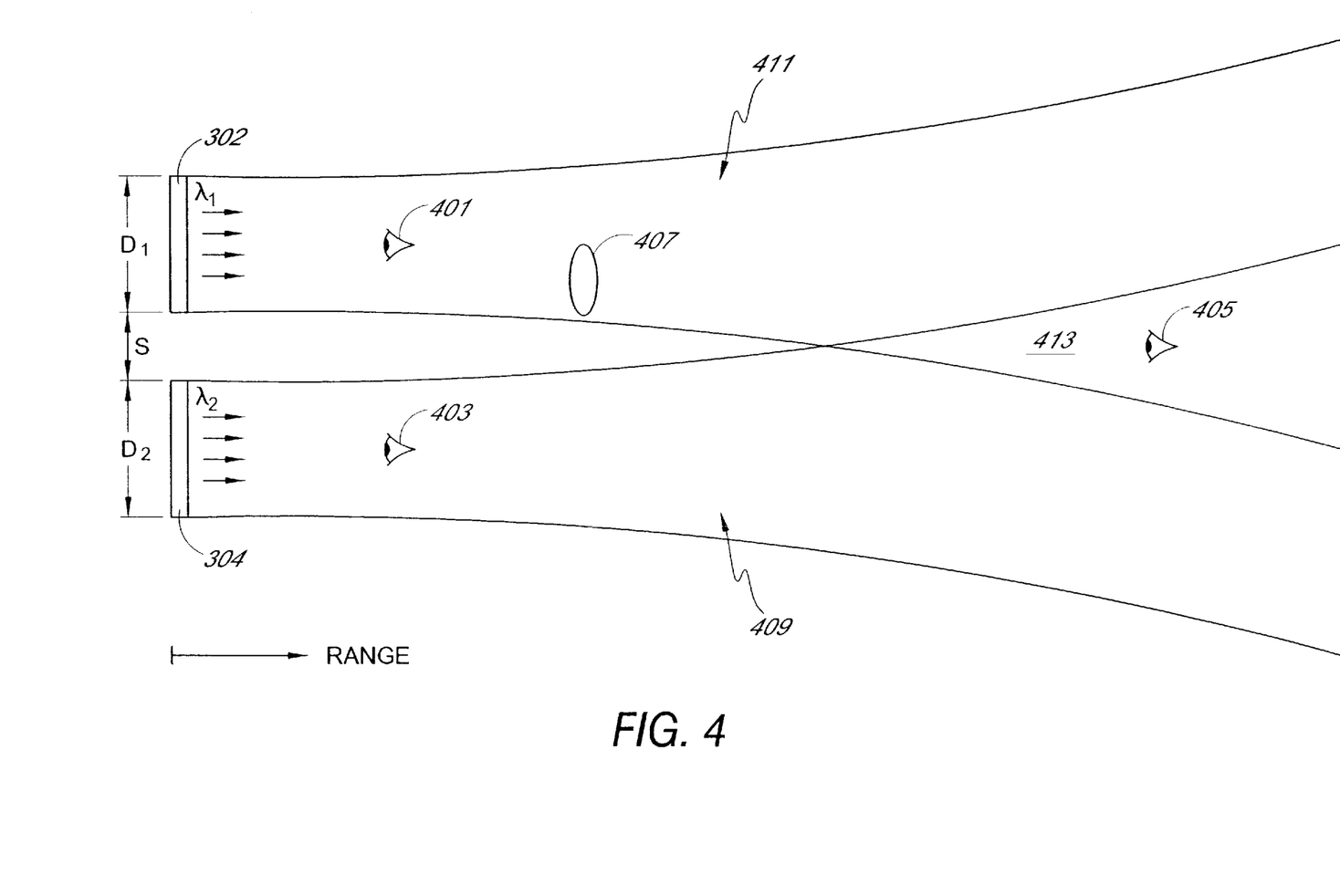
FIG. 4 is a diagram to illustrate the effect on viewers of the dual channel WON transceiver shown in FIG. 3.

FIG. 4 helps to illustrate the significance of values D1, D2 and S with respect to eye safety standards. As shown therein, the aperture sizes D1, D2 and the separation S between the apertures are set such that a human eye, whether aided or not, generally is not exposed radiation from both sources $\lambda_{1o}$, $\lambda_{2o}$. For example, an eye either at position 401, 403 or 407 could not simultaneously be exposed to radiation from both apertures 302 and 304. Accordingly, the power density of each of $\lambda_{1o}$ and $\lambda_{2o}$ can be set to the maximum allowable value for the classification of interest without violating standards or risking human sight. This is true even though the total output power density of the transceiver 300 in FIG. 3 would be roughly twice that of the total power density of the conventional transceiver shown in FIG. 1.

As shown in FIG. 4, the output beams 409, 411 from the two apertures 302, 304 in the near range remain relatively collimated but begin to spread out at far ranges. In region 413, for example, the two beams 409, 411 have spread and in fact overlap. Consequently, an eye at position 405 potentially would be exposed to radiation from both output beams $\lambda_{1o}$ and $\lambda_{2o}$. For that reason, parameters of the laser sources and optics, and/or values of D1, D2, and S, must be chosen such that an entity in region 413 would collect power no greater than the AEL under consideration. Generally, overlap region 413 would occur only at a range sufficiently far from the laser sources such that a considerable amount of the laser beam's power would be dissipated and the exposure would be well within the desired AEL.

In a typical Class 1 application, an 830 nm laser diode would be used as the source of $\lambda_{1o}$, a 785 nm laser diode would be used as the source of $\lambda_{2o}$, a 75 millimeter lens would be used for each of the apertures 302, 304 (thus D1 and D2 would have the same value (75 mm) and S would be set to be greater than or equal to 25 mm. As a result, an aided or unaided viewer in regions 409, 411 and/or 413 would receive no greater than the MPE of 0.56 milliwatts. At the same time, the transceiver 300 is able to transmit and receive data at roughly twice the bandwidth of conventional systems.

In alternative embodiments, a single optical transceiver could have three or more output channels (and a corresponding number of input channels), for example, by using three or more laser sources of different wavelengths, thereby increasing the bandwidth of the transceiver by a corresponding amount. In that case, however, if eye safety was a concern, care would have to be taken to ensure that the total power density emitted through any of the apertures did not exceed the AEL for the desired application. This three-or-more channel embodiment could be particularly advantageous, however, if the transceiver was to be used in an environment in which eye safety was not a concern (e.g., in an area that humans and/or other animals could not enter).

Figure 5:
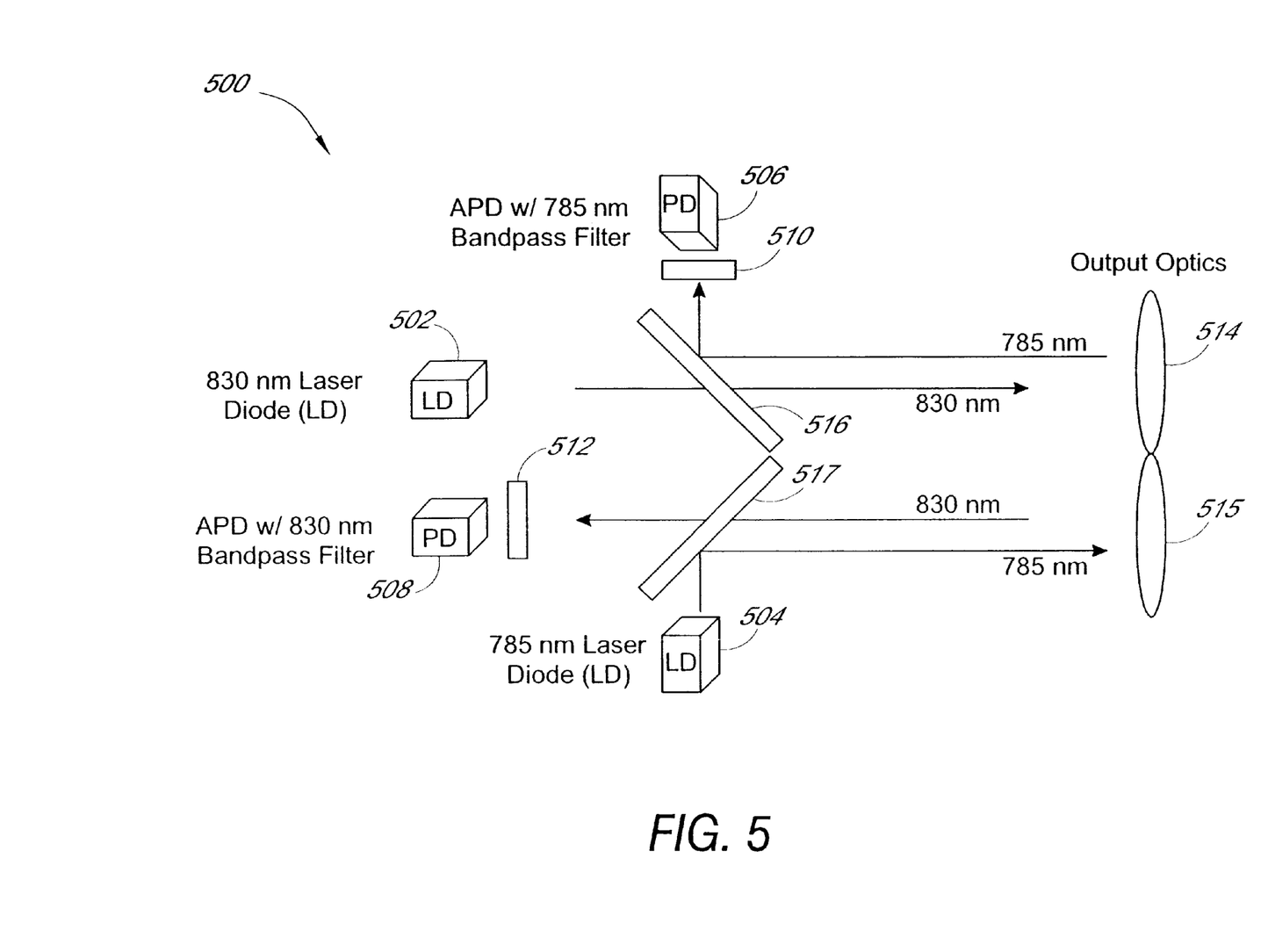
FIG. 5 shows an embodiment of a dual channel WON transceiver.

FIG. 5 is a block diagram of a dual wavelength optical transceiver 500 that provides a data rate of 2.5 Gigabits per second (2 channels×1.25 Gbps/channel). This embodiment uses two dichroic mirrors 516, 517 as beam splitters to differentiate between the different wavelength laser beams. The transceiver 500 also includes two sets of optics 514, 515, each of which focuses one output beam and receives one input beam; two laser diodes (LDs) 502, 504—one for each of the different wavelengths emitted; two photodetectors (PDs) 506, 508—one for each of the different wavelengths received; and two bandpass filters 510, 512 for filtering each of the two received beams.

In FIG. 5, one output channel is provided by LD 502 which is driven at 1.25 Gbps and which emits a laser beam having a wavelength of 830 nm. Other laser sources could be used in place of LD 502, for example, fiber lasers, gas lasers, diode-pumped solid state (DPSS) lasers and the like. The optical filter characteristics of the dichroic mirror 516, described in more detail below, are such that radiation having a wavelength of 830 nm is passed (i.e., transmitted) by the mirror 516 to the optics 514, thereby emitting an output beam. The optical filter characteristics of the mirror 516 also are such that input channel beams of 785 nm (e.g., transmitted by another transceiver at a remote location) received by the optics 514 are reflected by the mirror 516 to the filter 510 and PD 506.

The other output and input channels of the transceiver 500 are provided in a similar manner by LD 504, PD 508, filter 512, optics 515, and mirror 517. Specifically, the second output channel laser beam of wavelength 785 nm emitted by LD 504 (also driven at 1.25 Gbps) is reflected by the mirror 517 and focused by optics 515. An input laser beam of wavelength 830 nm passes through mirror 517 to filter 512 and PD 508, thereby forming the second input channel.

By using the arrangement of components shown in FIG. 5, the transceiver 500 has two output channels of different wavelengths and two input channels of different wavelengths. Collectively, these two bidirectional channels provide roughly twice the bandwidth of the conventional optical transceiver shown in FIG. 1. At the same time, by separating the two output beams, the transceiver 500 is capable of operating in an eye safe manner that complies with eye safety regulations.

Figure 6:
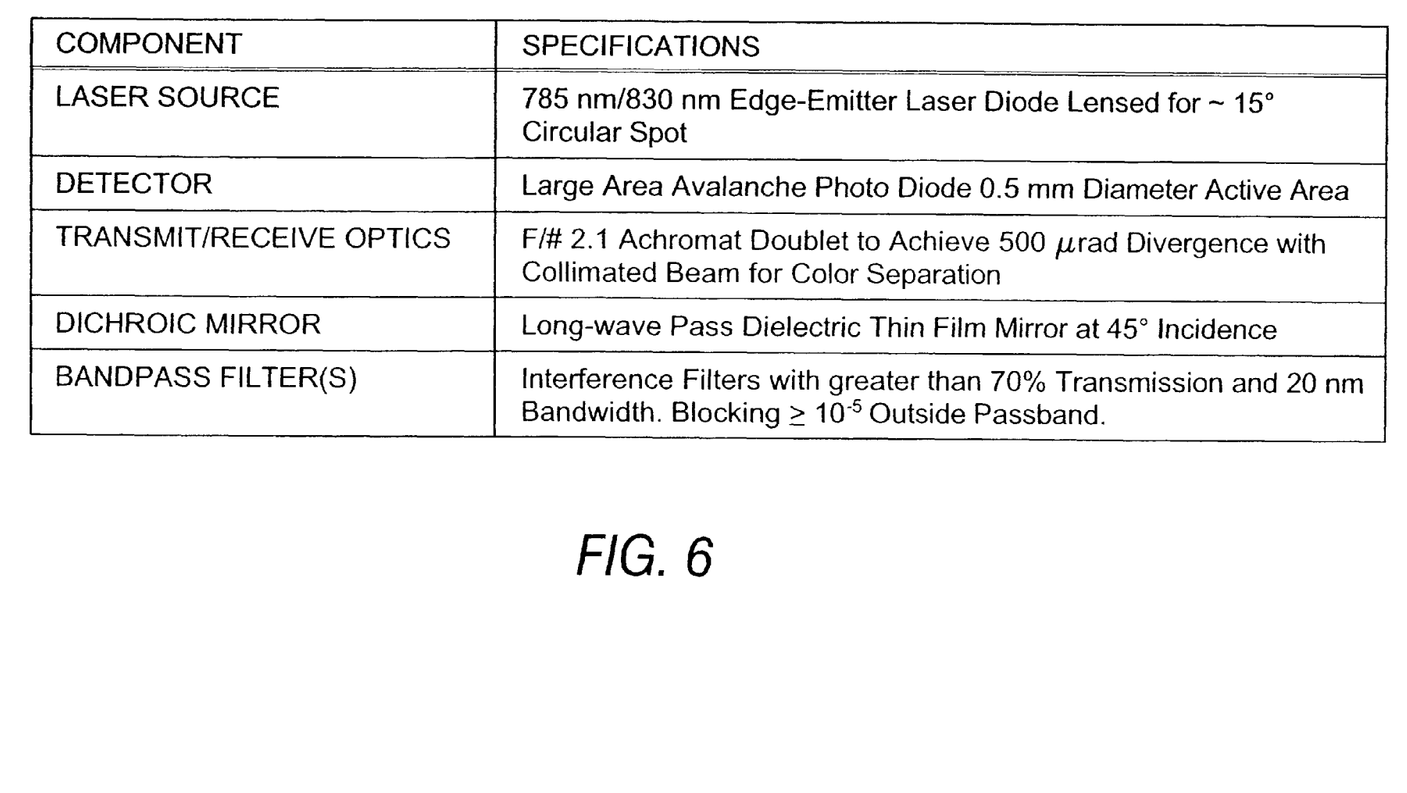
FIG. 6 is a table showing parameters of the dual channel WON transceiver shown in FIG. 5.

FIG. 6 is a table showing parameters of the components used in the embodiment of FIG. 5.

Figure 7:
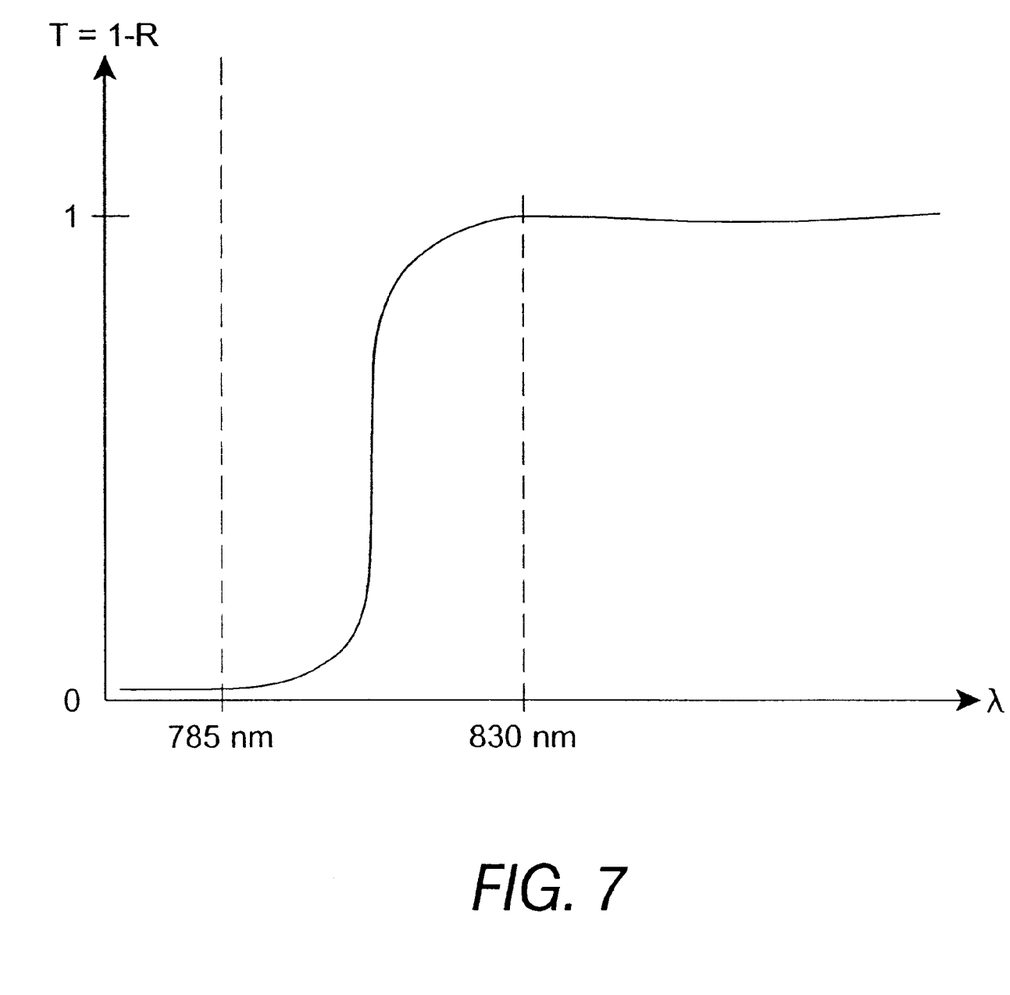
FIG. 7 is a graph showing filter characteristics of a dichroic mirror used in one embodiment.

FIG. 7 shows a graph (the vertical axis is Transmittance, T, where T=1—Reflectance, R; the horizontal axis is wavelength) of the optical filter characteristics of the dichroic mirrors used in the embodiment of FIG. 5. Each dichroic mirror effectively acts as an optical high pass filter that passes radiation of wavelengths longer than a predetermined threshold and reflects radiation of wavelengths shorter than a predetermined threshold. As shown in FIG. 7, beams of wavelength 785 nm are reflected by the dichroic mirror (i.e., T is at or near zero and R is at or near one) while beams of wavelength 830 nm are passed by the dichroic mirror (i.e., T is at or near one and R is at or near zero). Other wavelength pairs could be used instead of 785 nm and 830 nm. For example, one of the wavelengths could be a value between 1530 nm and 1570 nm (e.g., 1550 nm). If the difference between the two wavelengths used becomes too small, however, then it generally becomes more expensive and/or complicated to design an optical bandpass filter that is capable of differentiating between the beams. In the embodiment of FIG. 5, the difference between the wavelengths of the two beams is 50 nm, which represents an adequate delta for purposes of differentiation using a dichroic mirror of readily available commercial quality.

Although a pair of dichroic mirrors is used in the embodiment of FIG. 5, other optical bandpass filter devices could be used to differentiate between the beams of different wavelengths. Moreover, although two dichroic mirrors having identical filter characteristics are used in the embodiment of FIG. 5, mirrors having different characteristics could be used to differentiate between different wavelength beams. For example, to facilitate a different layout of components in the transceiver, the mirrors could have inverse characteristics (e.g., one mirror passes 830 nm and reflects 785 nm while the other mirror passes 785 nm and reflects 830).

Figure 8A:
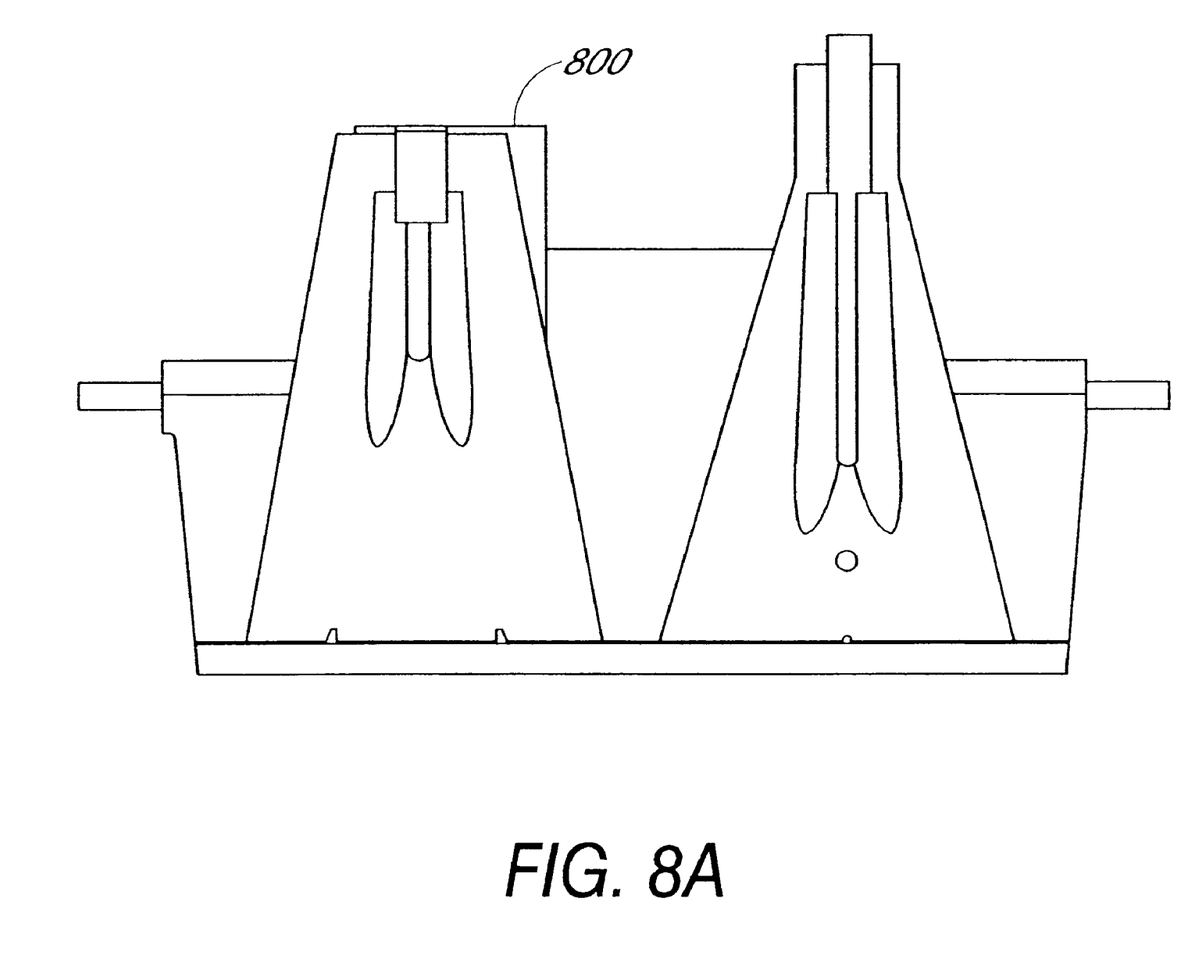
FIGS. 8A and 8B are plan views, respectively, of the housing and components forming a dual channel WON transceiver according to one embodiment.
Figure 8B:
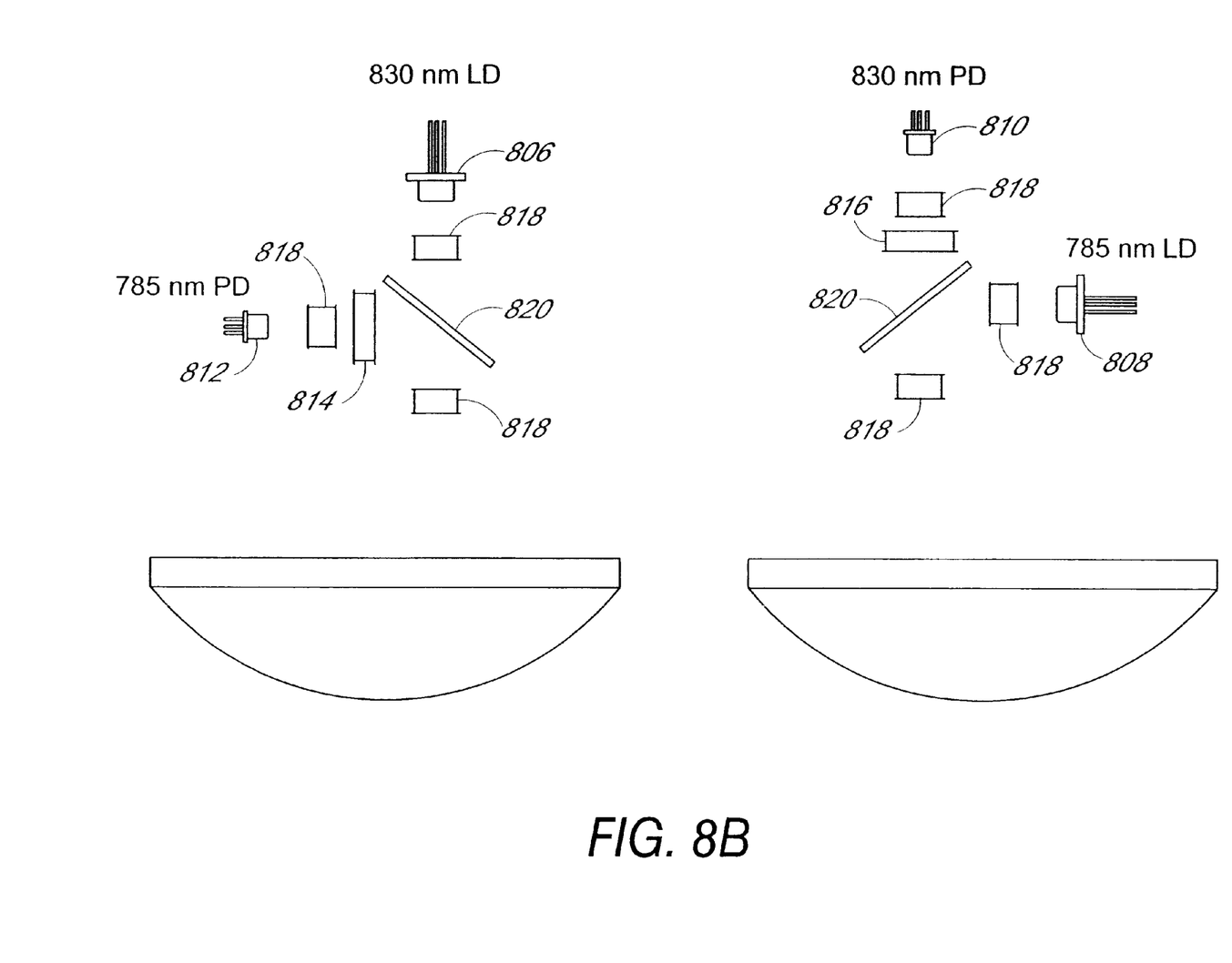

FIGS. 8A and 8B are plan views, respectively, of the housing and components forming a dual channel WON transceiver according to one embodiment. As shown therein, a housing 800 is adapted to hold two lenses 802, 804 and the various other components of the transceiver including an 830 nm laser diode 806, a 785 nm laser diode 808, an 830 nm photo diode 810, a 785 nm photo diode 812, a 785 nm bandpass filter 814, an 830 nm bandpass filter, two dichroic mirrors 820 and six lenses 818. These components are arranged and interact in the manner described above with reference to FIG. 5. The six lenses 818 are placed at various locations in the beam paths as shown in FIG. 8B and serve to collimate the beams that pass through.

Figure 9:
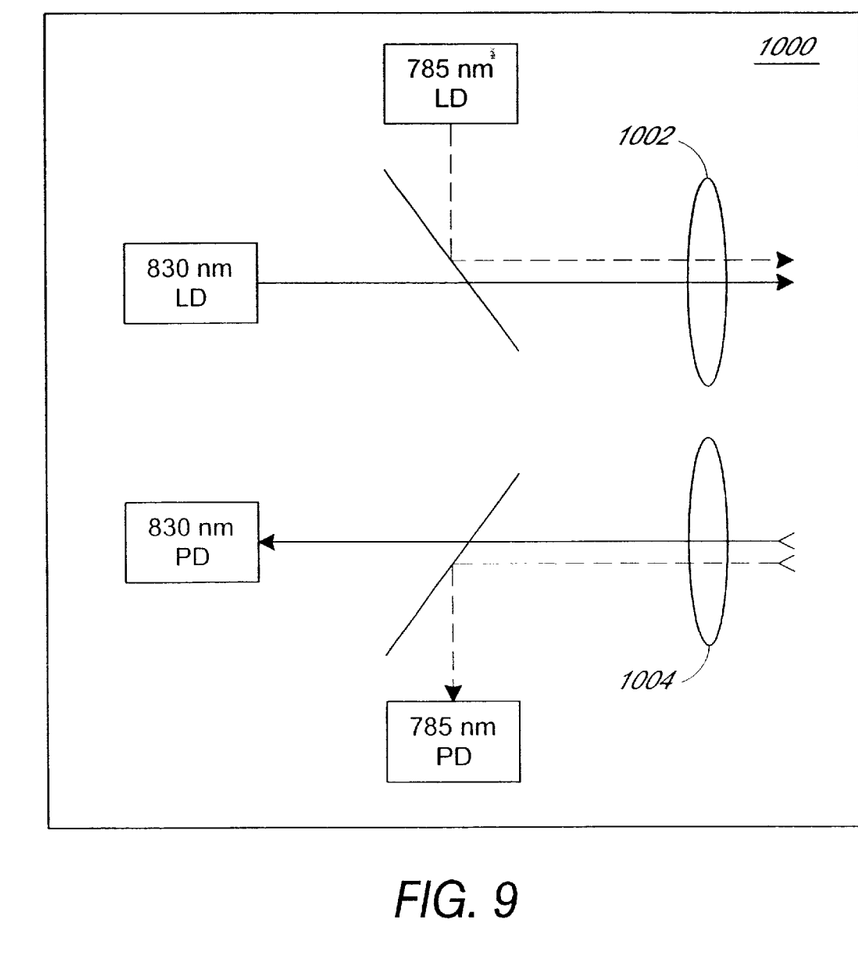
FIG. 9 shows an alternative embodiment of a dual channel WON transceiver.

FIG. 9 shows an alternative embodiment of the dual channel transceiver. In this configuration, one of the lenses 1002 is used to focus both of the output beams and the other lens 1004 is used to receive both of the input beams. Although this embodiment realizes the same increased bandwidth advantages as the embodiment of FIG. 5, it does not necessarily provide eye safety benefits. Because both of the output beams are transmitted through the same aperture—namely lens 102—the total power density of the beam emanating from lens 102 is roughly twice that of the conventional transceiver. Accordingly, depending on the particular application and environment in which the transceiver was to operate, the power densities of the two output beams might have to be reduced to comply with eye safety requirements.

Figure 10:
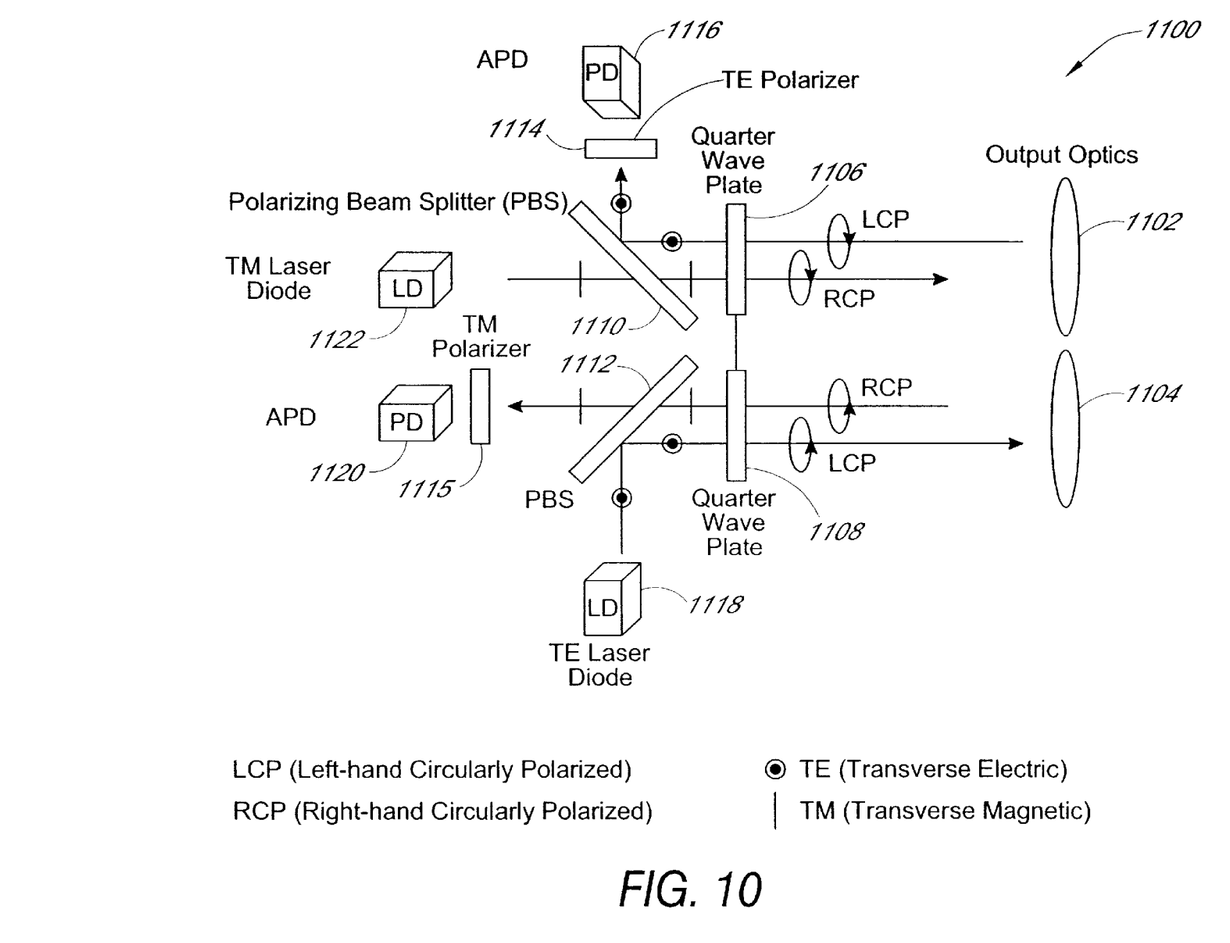
FIG. 10 shows a polarization-based embodiment of a dual channel WON transceiver.

FIG. 10 shows a polarization-based embodiment of a dual channel optical transceiver. In this embodiment, laser beams of different polarizations are used as the data transmission media and differentiation of the beams is performed by a polarizing beam splitter (PBS). More specifically, one output channel is provided by transverse magnetic (TM) laser diode 1122, which emits a laser beam having an output field that is substantially transverse magnetic. The optical filter characteristics of the PBS 1110 are such that TM radiation passes through PBS 1110 to the quarter wave plate 1106, which converts the TM radiation into a right-hand circularly polarized (RCP) beam, which is focused by optics 1102 to emit an output beam. A left-hand circularly polarized (LCP) input beam received by optics 1102 is converted by quarter wave plate 1110 into a transverse electric (TE) beam, which due to the optical filter characteristics of the PBS 1110, is reflected by the PBS 1110 to the TE polarizer 1114 and ultimately to PD 1116 (e.g., an avalanche photodiode).

The other output and input channels of the transceiver 1100 are provided in a similar manner by LD 1118, PD 1120, TM polarizer 1115, optics 1104, quarter wave plate 1108, and PBS 1112. Specifically, the second output channel TE laser beam emitted by LD 1118 (i.e., having an output field that is substantially transverse electric) is reflected by PBS 1112, converted into a LCP beam by quarter wave plate 1108 and focused by optics 1104 to emit a second output beam. An input RCP laser beam received by optics 1104 is converted into a TM beam by quarter wave plate 1108, and then passes through PBS 1112 to TM polarizer 1114 and ultimately to PD 1120, thereby forming the second input channel.

Various implementations of the systems and techniques described here may be realized in digital electronic circuitry, integrated circuitry, specially designed ASICs (application specific integrated circuits) or in computer hardware, firmware, software, or combinations thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. An optical transceiver configured for communicating high data rates via free space lasers while maintaining a safe exposure level to an observer's eye, the optical transceiver comprising:
    a plurality of laser sources including a first laser source configured to transmit a first output channel beam having a first optical characteristic and at least a second laser source configured to transmit a second output channel beam having a second optical characteristic;
    a plurality of detectors including a first detector configured to detect a first input channel beam having the first optical characteristic and at least a second detector configured to detect a second input channel beam of the second optical characteristic; and
    a plurality of apertures including a first aperture through which the first output channel beam and the second input channel beam pass and a second aperture through which the second output channel beam and the first input channel beam pass, wherein the first aperture and the second aperture are physically separated to limit a maximum observable power density to a predetermined value.

2. The system of claim 1, wherein the first output channel beam and the second output channel beam overlap in a region, such that the maximum observable power density in the region does not exceed the predetermined value.

3. The system of claim 2, wherein the physical separation between the first aperture and the second aperture is about 25 millimeters or greater.

4. The system of claim 2, wherein the first aperture has a first diameter and the second aperture has a second diameter, both diameters being selected such that the maximum observable power density in the region does not exceed the predetermined value.

5. The system of claim 4, wherein the first diameter is different from the second diameter.

6. The system of claim 4, wherein the first diameter is the same as the second diameter.

7. The system of claim 6, wherein the first diameter and the second diameter are about 75 millimeters.

8. The system of claim 4, wherein the predetermined value provides a safe exposure level to an observer's eye.

9. The system of claim 8, wherein the safe exposure level satisfies a class 1 AEL level.

10. The system of claim 8, wherein the safe exposure level satisfies a class 1M AEL level.

11. An optical transceiver configured for communicating high data rates via free space lasers while maintaining a safe exposure level to an observer's eye, the optical transceiver comprising:
    a plurality of dichoric mirrors, each dichoric mirror configured to pass a beam of a first wavelength and reflect a beam of a second wavelength;
    a plurality of laser sources including a first laser source arranged to transmit a first output channel beam of the first wavelength through a first dichoric mirror and a second laser source arranged to transmit a second output channel beam of the second wavelength that is reflected by a second dichoric mirror;
    a plurality of photodetectors including a first detector configured to detect a first input channel beam of the second wavelength reflected by the first dichoric mirror and a second detector configured to detect a second input channel beam of the first wavelength passed by the second dichoric mirror; and
    a plurality of lenses including a first lens arranged to focus the first output channel beam and the first input channel beam and a second lens arranged to focus the second output channel beam and the second input channel beam, wherein the first lens and the second lens are physically separated to reduce a laser exposure level for an observer's eye to a predetermined level.

12. The system of claim 11, wherein the first output channel beam and the second output channel beam overlap such that the laser exposure level in the region does not exceed the predetermined value.

13. The system of claim 12, wherein the physical separation between the first lens and the second lens is about 25 millimeters or greater.

14. The system of claim 12, wherein the first lens has a first diameter and the second lens has a second diameter, wherein the first diameter and the second diameter are selected such that the laser exposure level does not exceed the predetermined value.

15. The system of claim 14, wherein the first diameter is different from the second diameter.

16. The system of claim 14, wherein the first diameter is the same as the second diameter.

17. The system of claim 16, wherein the first diameter and the second diameter are about 75 millimeters.

18. The system of claim 14, wherein the predetermined value provides a safe exposure level to an observer's eye.

19. The system of claim 18, wherein the safe exposure level satisfies a class 1 AEL level.

20. The system of claim 18, wherein the safe exposure level satisfies a class 1M AEL level.

21. A method for controlling laser power, from an optical transceiver configured for communicating high data rates via free space lasers using a plurality of beams, while maintaining a safe exposure level to an observer's eye, the method comprising:
    transmitting at a first data rate using a first beam through a first aperture at a first power level that does not exceed a predetermined value;
    transmitting at a second data rate using a second beam through a second aperture at a second power level that does not exceed the predetermined value, wherein the first aperture and the second aperture are physically separated a distance S so that in a region where the first beam and the second beam overlap a combined observable laser power does not exceed the predetermined value;
    increasing the first data rate and the first power level while not exceeding the predetermined value;
    if increasing the first power level will exceed the predetermined value, allocating a portion of the first data rate to the second beam; and transmitting the portion using the second beam through the second aperture at a third power level that does not exceed the predetermined value.

22. The method of claim 21, wherein the first beam and the second beam transmit using different wavelengths.

23. The method of claim 22, wherein the distance S is about 25 millimeters or greater.

24. The method of claim 21, further comprising selecting a diameter D1 for the first aperture and a diameter D2 for the second aperture, both selected so that the combined observable laser power does not exceed the predetermined value.

25. The method of claim 24, wherein the diameter D1 is different than the diameter D2.

26. The method of claim 24, wherein the diameter D1 is the same as the diameter D2.

27. The method of claim 26, wherein the diameter D1 and the diameter D2 are about 75 millimeters.

28. The method of claim 24, wherein the predetermined value provides a safe exposure level to an observer's eye.

29. The method of claim 28, wherein the safe exposure level satisfies a class 1 AEL level.

30. The method of claim 28, wherein the safe exposure level satisfies a class 1M AEL level.

31. An optical transceiver configured for communicating high data rates via free space lasers while maintaining a safe exposure level to an observer's eye, the optical transceiver comprising:
    a first laser source configured for communicating information via a first beam using up to a maximum power level;
    a second laser source configured for communicating information via a second beam using up to the maximum power level, wherein the first beam and the second beam interfere in a region where a maximum observable power level does not exceed the maximum power level;
    a first lens coupled to the first laser source and located in the path of the first beam, the first lens having a diameter D1; and
    a second lens coupled to the second laser source at a distance S from the first lens and located in the path of the second beam, the second lens having a diameter D2, wherein the distance S and the diameters D1 and D2 are selected to ensure that the maximum observable power level does not exceed the maximum power level.

32. The optical transceiver of claim 31, wherein the first beam transmits using a first wavelength and the second beam transmits using a second wavelength.

33. The optical transceiver of claim 32, further comprising:
    a first detector configured to detect a first input beam which passes through the first aperture using the first wavelength; and
    a second detector configured to detect a second input beam which passes through the second aperture using the second wavelength.

34. The optical transceiver of claim 33, wherein the distance S is about 25 millimeters or greater.

35. The optical transceiver of claim 33, wherein the diameter D1 is different from the diameter D2.

36. The optical transceiver of claim 33, wherein the diameter D1 is the same as the diameter D2.

37. The optical transceiver of claim 36, wherein the diameters D1 and D2 are about 75 millimeters.

38. The optical transceiver of claim 33, wherein the maximum power level provides a safe exposure level to an observer's eye.

39. The optical transceiver of claim 38, wherein the safe exposure level satisfies a class 1 AEL level.

40. The optical transceiver of claim 38, wherein the safe exposure level satisfies a class 1M AEL level.

41. A method for use in a system having a plurality of optical transceivers, each transceiver configured to transmit data via a plurality of laser beams and receive data via a plurality of laser beams, both while maintaining a safe exposure level to an observer's eye, the method comprising:
    transmitting a first communication beam from a first transceiver through a first aperture to a second transceiver at a first power level which maintains a safe exposure level to an observer's eye;
    transmitting a second communication beam from the first transceiver through a second aperture to the second transceiver at a second power level, wherein the second aperture is located at a distance S from the first aperture to maintain the safe exposure level to an observer's eye; and
    if the first power level will be exceeded when transmitting a data from the first transceiver to the second transceiver via the first communication beam, allocating a first portion of the data for its transmission via the second communication beam to maintain the safe exposure level to an observer's eye.

42. The method of claim 41, further comprising selecting a diameter D1 for the first aperture and a diameter D2 for the second aperture, both to maintain the safe exposure level to an observer's eye.

43. The method of claim 42, wherein the first communication beam and the second communication beam overlap such that the laser exposure level in the region does not exceed the safe exposure level to an observer's eye.

44. The method of claim 43, wherein the safe exposure level to an observer's eye satisfies a class 1 AEL level.

45. The method of claim 43, wherein the safe exposure level to an observer's eye satisfies a class 1M AEL level.

46. A method for use in a system having a plurality of optical transceivers, each transceiver configured to transmit data via a plurality of laser beams and receive data via a plurality of laser beams, both while maintaining a safe exposure level to an observer's eye, the method comprising:
    transmitting a first communication beam from a first transceiver, through a first aperture with a diameter D1, to a second transceiver at a first power level which maintains a safe exposure level to an observer's eye;
    transmitting a second communication beam from the first transceiver, through a second aperture with a diameter D2, to the second transceiver at a second power level, wherein the second aperture is located at a distance S from the first aperture to maintain the safe exposure level to an observer's eye; and
    allocating data between the first communication beam and the second communication beam to maintain the safe exposure level to an observer's eye.

47. The method of claim 46, wherein the observer's eye is exposed to the first communication beam or the second communication beam.

48. The method of claim 47, wherein the observer's eye is located in a region where the first communication beam and the second communication beam overlap.

49. The method of claim 48, further comprising selecting D1 and D2 to limit a size of the region.

* * * * *